United States Patent Office 3,632,736
Patented Jan. 4, 1972

1

3,632,736
METHOD FOR THE X-RAY VISUALIZATION OF BODY CAVITIES AND A PREPARATION FOR CARRYING OUT THE METHOD
Björn G.-A. Ingelman, Uppsala, Sweden, assignor to Pharmacia AB, Uppsala, Sweden
No Drawing. Filed Dec. 26, 1968, Ser. No. 787,282
Claims priority, application Sweden, Dec. 28, 1967, 17,896/67
Int. Cl. A61k *27/08*
U.S. Cl. 424—5
24 Claims

ABSTRACT OF THE DISCLOSURE

Compositions which comprise at least one iodine compound of the formula:

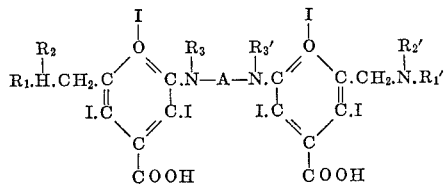

wherein $R_1$ and $R_1'$ are each hydrogen or a lower alkyl having no more than 5 carbon atoms, $R_2$; $R_2'$; $R_3$; and $R_3'$ are each lower acyl having no more than 5 carbon atoms, and A is an alkylene group substituted by 1 or more substituents of the formula $—O—R_4$, wherein $R_4$ is hydrogen or lower alkyl or acyl having no more than 5 carbon atoms; the alkylene group containing 3 to 20 carbon atoms and being optionally broken by one or more oxygen bridges, or a physiologically acceptable salt thereof. Such compositions are useful as X-ray contrast compositions and are administered to the body of the test object for the X-ray visualization of the body cavity.

---

The present invention is concerned with a method for the X-ray visualization of body cavities and a preparation for carrying out the method.

The method of the invention is mainly characterized in that there is administered to the body of the test object a preparation comprising or consisting of one or more iodo compounds of the formula:

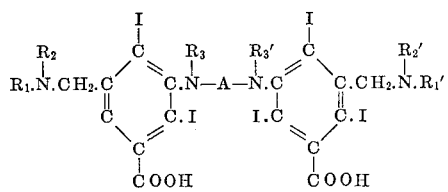

wherein $R_1$ and $R_1'$ are each hydrogen or lower alkyl having no more than 5 carbon atoms, $R_2$; $R_2'$; $R_3$; and $R_3'$ are each lower acyl having no more than 5 carbon atoms, and A is an alkylene group substituted by one or more substituents of the formula $—O—R_4$, wherein $R_4$ is hydrogen or lower alkyl or acyl having no more than 5 carbon atoms; the alkylene group containing 3-20 (for example 3-15) carbon atoms and being optionally broken by one or more oxygen bridges, or physiologically acceptable salts thereof. In the aforementioned formulae and likewise in the following the symbols with the same base index are normally the same, i.e. $R_1=R_1'$, $R_2=R_2'$ and $R_3=R_3'$, but they can also be different.

In a preferred embodiment each nitrogen atom in the bridge

2

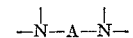

is situated at a distance of two carbon atoms from a group of the formula $—O—R_4$. Preferably not more than one oxygen atom is bound to one and the same carbon atom in the bridge A. The bridge A suitably contains 3–10 carbon atoms in the alkylene group.

The substituents $R_1$ and $R_1'$ may be, for instance, hydrogen, methyl or ethyl and substituents $R_2$, $R_2'$, $R_3$ and $R_3'$ may be, for instance acetyl or propionyl. $R_4$ is preferably hydrogen when hydrophilic compounds are desired. Consequently, in most fields of use $R_4$ is preferably hydrogen. When compounds with more lipophilic characteristics are desired $R_4$ is chosen in the formula of lower alkyl or acyl, for instance methyl or ethyl or acetyl or propionyl.

Examples of the bridge A in the aforementioned formulae are:

$$—CH_2.CH(OH).CH_2—$$

or $$—CH_2.CH(OH).CH_2.O.CH_2.CH(OH).CH_2—$$

or $$—CH_2.CH(OH).CH_2.O.CH_2.CH_2.$$
$$O.CH_2.CH(OH).CH_2—$$

or $$—CH_2.CH(OH).CH_2.O.(CH_2)_4.O.CH_2.CH(OH).CH_2—$$

or $$—CH_2.CH(OH).CH_2.O.\overset{CH_3}{\underset{|}{CH}}.CH_2.$$
$$CH_2.O.CH_2.CH(OH).CH_2—$$

or $$—CH_2.CH(OH).CH_2.O.CH_2.CH_2.O.$$
$$CH_2.CH_2.O.CH_2.CH(OH).CH_2—$$

or $$—CH_2.CH(OH).CH_2.O.CH_2.CH(OH).$$
$$CH_2.O.CH_2.CH(OH).CH_2—$$

or $$—CH_2.CH(OH).CH(OH).CH_2—$$

or $$—CH_2.CH(OH).CH_2.O.CH_2.CH(OH).CH_2.O.$$
$$(CH_2)_2.O.CH_2.CH(OH).CH_2.O.CH_2.CH(OH).CH_2—$$

or $$—CH_2.CH(OH).CH_2.O.CH_2.CH(OH).CH_2.O.(CH_2)_4.$$
$$O.CH_2.CH(OH).CH_2.O.CH_2.CH(OH).CH_2—$$

or any of the aforementioned bridges in which one or more hydroxyl groups have been alkylated or acylated with lower alkyl or acyl having no more than 5 carbon atoms, e.g. methyl or ethyl or acetyl or propionyl.

Examples of salts of the aforementioned compounds are sodium salt methylglucamine salts, tris-hydroxy methyl-amino-methane salts, or some other non-toxic salts. These salts can be used in the form of an aqueous solution.

Examples of such compounds are:

[chemical structure diagram]

wherein $R_1$ and $R_1'$ are each hydrogen or methyl and wherein A is

—CH$_2$.CH(OH).CH$_2$.O.(CH$_2$)$_4$.O.CH$_2$.CH(OH).CH$_2$— or

—CH$_2$.CH(OH).CH$_2$.O.(CH$_2$)$_2$.O.CH$_2$.CH(OH).CH$_2$— or

—CH$_2$.CH(OH).CH$_2$.O.CH$_2$.CH(OH).CH$_2$— or

—CH$_2$.CH(OH).CH$_2$.O.CH$_2$.CH(OH).CH$_2$.O.CH$_2$.CH(OH).CH$_2$— or

—CH$_2$.CH(OH).CH$_2$— or any of the aforementioned bridges in which one or more hydroxyl groups have been alkylated or acylated with lower alkyl or acyl having no more than 5 carbon atoms, e.g. methyl or ethyl or acetyl or propionyl, or physiologically acceptable salts thereof, e.g. sodium salts or methylglucamine salts.

A preparation for carrying out the method according to the invention may conveniently comprise a mixture, such as an eqous solution, or contain a physiologically acceptable solid carrier, the preparation preferably being in tablet form or in the form of some other convenient dosage unit, which mixture contains one or more of the aforementioned compounds as an active contrast producing substance.

When applying the method of the invention, the body of the test object to which the contrast-producing agent has been administered, is exposed to X-rays, whereupon photographs may be taken, or the image may be observed direct on a fluorescence screen, or some other X-ray method may be used in a conventional manner. The dose of contrast-producing agent administered is selected according to the category of investigation, so that a sufficient contrast effect is obtained.

One example of the different body cavities which can be visibilized according to the invention is the gastrointestinal tract. In this instance the contrast-producing agent is administered perorally in solid or solution form. It is also possible to visibilize the intestines by administering the contrast-producing agent rectally, in the form of an enema. Another example is the visibilization of blood vessels upon injecting the contrast-producing agent in the form of a sterile solution. Subsequent to being injected intraveneously, the contrast-producing agent is excreted with the urine and enables the renal pelvis, ureters and bladders to be visibilized. Further examples are the use of the iodopolymers in hysterosalpinography, cholangiography, lymphography, urethography and sialography.

The novel iodo compounds used according to the invention have a low toxicity, e.g. when administered intraveneously, and present excellent characteristics as X-ray contrast-producing agents. They also present good stability.

Carriers for the iodo compounds may be conventional additive substances, such as water with regard to injection solutions and usual adjuvants when in tablet form.

If the preparation of the invention is in the form of an aqueous solution the concentration of the iodo compounds used is selected in dependence on the field of use. Preferably a content exceeding 10 grams per 100 ml. of solution is chosen.

Normally, however, a much higher content is selected, e.g. in the order of 20, 30, 40 or 50 grams or more per 100 ml. of solution.

The aforementioned iodo compounds may be prepared, for instance, by reacting compounds of the formula

Y.A.X wherein A has the aforementioned significance, R$_4$ preferably being hydrogen and wherein Y and X are each halogen, preferably chloro or bromo, or corresponding epoxide compounds obtainable from the compound Y.A.X by splitting off hydrogen halide, with one mole of a compound of the formula

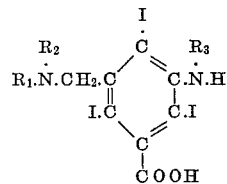

or salts thereof, wherein R$_1$, R$_2$ and R$_3$ each have the aforementioned significance, and with 1 mole of a compound with the formula

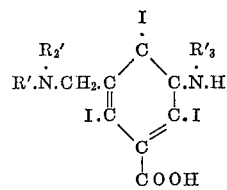

or salts thereof, wherein R$_1'$, R$_2'$ and R$_3'$ each have the aforementioned significance. The obtained compounds are recovered either as dicarboxylic acids or in the form of physiologically acceptable salts.

Examples of such salts are sodium salt, or methyl glucamine salt. Sodium and methyl glucamine salts have satisfactory solubility in water.

If R$_1$ and/or R$_1'$ is hydrogen minor quantities of secondary products can be obtained as these hydrogen atoms have a certain but low reactivity. The formation of such secondary products can be suppressed if desired by selecting mild reaction conditions and an excess of the iodo-monocarboxylic acids in relation to the bridge formers. (The excess hereof can be recovered and used in the next batch.) Neither need the monocarboxylic acids and said secondary products be removed since they are acceptable to the body. If it is desired to completely avoid formation of such secondary products R$_1$ and R$_1'$ are selected in the form of lower alkyl, e.g. methyl.

Examples of the bifunctional compounds of the type Y.A.X or corresponding epoxide compounds obtainable by splitting off hydrogen halide are:

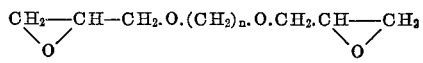

where $n$ is an integer from 2 to 4 inclusive, and

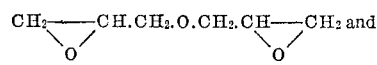

or corresponding halogen hydrins, and bifunctional glycerine derivatives of the formula

X.CH$_2$.CH(OH).CH$_2$—Y e.g. dichlorohydrin and dibromohydrin, or corresponding epoxy compounds obtainable by splitting off hydrogen halide and having the formula

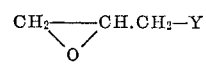

e.g. epichlorohydrin or epibromohydrin. Another example of such a bifunctional compound is 1,2- 3,4-diepoxy-butane.

The reaction is preferably carried out in a solvent, e.g. water, or an aqueous liquid, and there is suitably added alkaline reacting substances, e.g. alkali-metal hydroxides, the alkaline substance acting as a catalyst. The alkaline substance can also function as an acceptor for any hydrogen halide liberated during the reaction. If it is desired to convert one or more hydroxyl groups in the bridge to alkylated or acylated hydroxyl groups, the obtained compounds are treated with an alkylating agent or acylating agent, e.g. dimethylsulphate or acetic acid anhydride in a conventional manner for alkylating or acylating hydroxyl groups.

The reaction can be carried out at different temperatures, e.g. between 0 and 50° C., such as 20° C.

EXAMPLE 1

0.1 mole of 3-acetylamino-5-acetylaminomethyl-2,4,6-triiodobenzoic acid was dissolved in 50 ml. of an aqueous 4 N solution of sodium hydroxide, 0.05 mole of bis[2,3-epoxypropyl]-ether was slowly added dropwise to the solution at 20° C. whilst stirring. The reaction mixture was then allowed to stand for one day at 20° C., whereafter 6 N HCl was added in an amount sufficient to precipitate the dicarboxylic acid formed in the reaction. The acid was cleansed by washing with water and reprecipitation, and then dried in vacuum at 50° C. The yield of dicarboxylic acid was approximately 50–60 grams. The obtained product can be further cleansed by solution and precipitation.

Solutions can be prepared from the obtained acid by adding water and, for instance, equivalent quantities of sodium hydroxide or methylglucamine.

EXAMPLE 2

0.1 mole of 3-acetylamino-5-acetylaminomethyl-2,4,6-triiodobenzoic acid was dissolved in 50 ml. of an aqueous 4 N solution of sodium hydroxide. 0.05 mole of 1,2-ethanedioldiglycide ether were slowly added dropwise to the solution at 20° C. whilst stirring. The reaction mixture was then allowed to stand for one day at 20° C., whereafter 6 N HCl were added in an amount sufficient to precipitate the dicarboxylic acid formed in the reaction. The acid was cleansed by washing with water and reprecipitation, and was dried in a vacuum at 50° C. The yield of dicarboxylic acid was approximately 50–60 grams. The obtained product can be further cleansed by solution and precipitation.

Solutions can be prepared from the obtained acid by adding water and, for instance, equivalent quantities of sodium hydroxide or methyl glucamine.

EXAMPLE 3

0.1 mole of 3-acetylamino-5-acetylaminomethyl-2,4,6-triiodobenzoic acid were dissolved in 50 ml. of an aqueous 4 N solution of sodium hydroxide. 0.05 mole of 1,4-butanedioldiglycide ether was slowly added to the solution dropwise at 20° C. whilst stirring. The reaction mixture was then allowed to stand for one day at 20° C., whereafter 6 N HCl were added in an amount sufficient to precipitate the dicarboxylic acid formed in the reaction. The acid was cleansed by washing with water and reprecipitation, and dried in vacuum at 50° C. The yield of dicarboxylic acid was about 50–60 grams. The obtained product can be further cleansed by a further dissolution and precipitation process.

The obtained product can then be converted into salts, from which aqueous solutions can be prepared as in Examples 1 and 2.

EXAMPLE 4

In a manner similar to that defined in Example 1, 0.1 mole of 3-acetylamino-5-acetylaminomethyl-2,4,6-triiodobenzoic acid were reacted with 0.05 mole epichlorohydrin or with 0.05 mole of epibromohydrin or with 0.05 mole dichlorohydrin.

The resulting dicarboxylic acid was cleansed in the manner described in Example 1.

EXAMPLE 5

Solutions were prepared from each of the dicarboxylic acids obtained in Examples 1, 2, 3 and 4 in the following manner:

40 grams of substance and equivalent amounts of methyl glucamine were dissolved in water to a solution volume of 100 ml. pH was adjusted to 7.3–7.4. The solution was filtered and poured into bottles, which were sealed and sterilized in an autoclave.

EXAMPLE 6

The solutions from Example 5 were injected in the blood vessels of rabbits, whereafter the blood vessels could be visibilized by X-rays and photographs.

Subsequent X-ray exposure and photographing of the gastro-area showed excellent contrast filling of the renal pelvis, ureters and bladders.

EXAMPLE 7

Solutions from Example 5 were administered orally to rabbits, whereafter the gastro-intestinal tract could be visibilized by X-rays and photographs, with excellent results.

EXAMPLE 8

Solutions of sodium salts of the compounds prepared in a manner similar to that described in Example 5 and containing 20 grams of the dicarboxylic acids per 100 ml. of solution were administered rectally to rabbits in the form of an enema, whereafter the intestines could be observed by X-rays and photographs, with good results.

What I claim is:

1. A method for the X-ray visualization of body cavities, which comprises administering to the body of the test object as a contrast-producing agent a preparation comprising at least one member selected from the group consisting of (1) iodo compounds of the formula

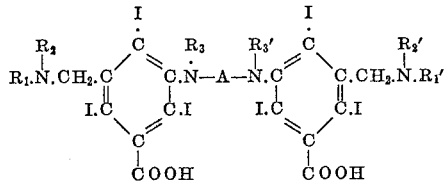

wherein $R_1$ and $R_1'$ are each a member selected from the group consisting of hydrogen and lower alkyl having no more than 5 carbon atoms and $R_2$, $R_2'$, $R_3$ and $R_3'$ are each lower acyl having no more than 5 carbon atoms and wherein A is an alkylene group substituted by at least one substituent of the formula —O—$R_4$, wherein $R_4$ is a member selected from the group consisting of hydrogen, lower alkyl and acyl having no more than 5 carbon atoms, said alkylene group containing 3–20 carbon atoms, and (2) physiologically acceptable salts thereof, said preparation being administered in an amount effective to give a sufficient contrast effect.

2. The method of claim 1 wherein each nitrogen atom in the bridge

—N—A—N— of the iodo compound is situated at a distance of two carbon atoms from a group —O—$R_4$ and wherein not more than one oxygen atom is bound to one and the same carbon atom in the bridge A.

3. The method of claim 1, wherein $R_1$ and $R_1'$ in the iodo compound are each a member selected from the group consisting of hydrogen; methyl; and ethyl and $R_2$; $R_2'$; $R_3$ and $R_3'$ are each a member selected from the group consisting of acetyl and propionyl and $R_4$ is a member selected from the group consisting of hydrogen; methyl; ethyl; acetyl; and propionyl.

4. A method for the X-ray visualization of body cavities, which comprises administering to the body of the test object as a contrast-producing agent a preparation comprising at least one member selected from the group consisting of (1) iodo compounds of the formula wherein $R_1$ and $R_1'$ are each a member selected from the group consisting of hydrogen and lower alkyl having no more than 5 carbon atoms and $R_2$, $R_2'$, $R_3$ and $R_3'$ are each lower acyl having no more than 5 carbon atoms, and wherein A is an alkylene group substituted by at least one substituent of the formula —O—$R_4$, wherein $R_4$ is a member selected from the group consisting of hydrogen, lower alkyl and acyl having no more than 5 carbon atoms, said alkylene group containing 3–20 carbon atoms and being broken by at least one oxygen bridge, and (2) physiologically acceptable salts thereof; said preparation being administered in an amount effective to give a sufficient contrast effect.

5. The method of claim 4 wherein each nitrogen atom in the bridge

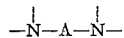

of the iodo compound is situated at a distance of two carbon atoms from a group —O—$R_4$, and wherein not more than one oxygen atom is bound to one and the same carbon atom in the bridge A.

6. The method of claim 4, wherein $R_1$ and $R_1'$ in the iodo compound are each a member selected from the group consisting of hydrogen, methyl and ethyl and $R_2$, $R_2'$, $R_3$ and $R_3'$ are each a member selected from the group consisting of acetyl and propionyl and $R_4$ is a member selected from the group consisting of hydrogen, methyl, ethyl, acetyl and propionyl.

7. The method of claim 4 wherein the bridge A in the iodo compound is a member selected from the group consisting of —CH$_2$.CH(OH).CH$_2$.O.(CH$_2$)$_4$.O.CH$_2$.CH(OH).CH$_2$—
—CH$_2$.CH(OH).CH$_2$.O.(CH$_2$)$_2$.O.CH$_2$.CH(OH).CH$_2$—
—CH$_2$.CH(OH).CH$_2$.O.CH$_2$.CH(OH).CH$_2$—
—CH$_2$.CH(OH).CH$_2$.O.CH$_2$.CH(OH).
                CH$_2$.O.CH$_2$.CH(OH).CH$_2$—
—CH$_2$.CH(OH).CH$_2$.O.CH$_2$.CH(OH).
    CH$_2$.O.(CH$_2$)$_2$.O.CH$_2$.CH(OH).CH$_2$O.
              CH$_2$.CH(OH).CH$_2$—
—CH$_2$.CH(OH).CH$_2$.O.CH$_2$.CH(OH).
    CH$_2$.O.(CH$_2$)$_4$.O.CH$_2$.CH(OH).CH$_2$.O.
              CH$_2$.CH(OH).CH$_2$— and the aforesaid bridges in which at least one hydroxyl group is alkylated with lower alkyl having no more than 5 carbon atoms.

8. The method of claim 4 wherein the bridge A in the iodo compound is a member selected from the group consisting of —CH$_2$.CH(OH).CH$_2$.O.(CH$_2$)$_4$.O.CH$_2$.CH(OH).CH$_2$—
—CH$_2$.CH(OH).CH$_2$.O.(CH$_2$)$_2$.O.CH$_2$.CH(OH).CH$_2$—
—CH$_2$.CH(OH).CH$_2$O.(CH$_2$)$_2$.O.CH$_2$CH(OH).CH$_2$—
—CH$_2$.CH(OH).CH$_2$.O.CH$_2$.(OH)CH.
              CH$_2$.O.CH$_2$.CH(OH).CH$_2$—
—CH$_2$.CH(OH).CH$_2$.O.CH$_2$.CH(OH).
    CH$_2$.O.(CH$_2$)$_2$.O.CH$_2$.CH(OH).CH$_2$O.
              CH$_2$.CH(OH).CH$_2$—
—CH$_2$.CH(OH).CH$_2$.O.CH$_2$.CH(OH).
    CH$_2$.O.(CH$_2$)$_4$.O.CH$_2$.CH(OH).CH$_2$.O.
              CH$_2$.CH(OH).CH$_2$— and the aforesaid bridges in which at least one hydroxyl group is acylated with lower acyl having no more than 5 carbon atoms.

9. A method for the X-ray visualization of body cavities, which comprises administering to the body of the test object as a contrast-producing agent a preparation comprising at least one member selected from the group consisting of (1) iodo compounds of the formula

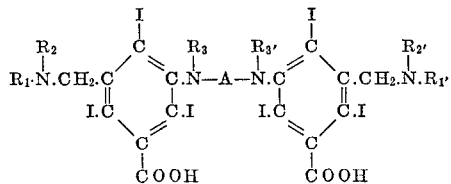

wherein $R_1$ and $R_1'$ are each a member selected from the group consisting of hydrogen and lower alkyl having no more than 5 carbon atoms and $R_2$, $R_2'$, $R_3$ and $R_3'$ are each lower acyl having no more than 5 carbon atoms and wherein A is an alkylene group substituted by at least one substituent of the formula —O—$R_4$, wherein $R_4$ is a member selected from the group consisting of hydrogen; lower alkyl and acyl having no more than 5 carbon atoms, said alkylene group containing 3–10 carbon atoms, and (2) physiologically acceptable salts thereof; said preparation being administered in an amount effective to give a sufficient contrast effect.

10. The method of claim 9, wherein each nitrogen atom in the bridge

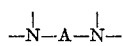

of the iodo compound is situated at a distance of two carbon atoms from a group —O—$R_4$ and wherein not more than one oxygen atom is bound to one and the same carbon atom in the bridge A.

11. The method of claim 9, wherein the bridge A in the iodo compound is a member selected from the group consisting of

—CH$_2$.CH(OH).CH$_2$—
—CH$_2$.CH(OH).CH(OH).CH$_2$— and the aforementioned bridges in which at least one hydroxyl group is alkylated with lower alkyl having no more than 5 carbon atoms.

12. The method of claim 9, wherein the bridge A in the iodo compound is a member selected from the group consisting of

—CH$_2$.CH(OH).CH$_2$—
—CH$_2$.CH(OH).CH(OH).CH$_2$— and the aforementioned bridges in which at least one hydroxyl group is acylated with lower acyl having no more than 5 carbon atoms.

13. The method of claim 9, wherein $R_1$ and $R_1'$ in the iodo compound are each a member selected from the group consisting of hydrogen; methyl; and ethyl and $R_2$; $R_2'$; $R_3$ and $R_3'$ are each a member selected from the group consisting of acetyl and propionyl and $R_4$ is a member selected from the group consisting of hydrogen; methyl; ethyl; acetyl; and propionyl.

14. A method for the X-ray visualization of body cavities, which comprises administering to the body of the test object as a contrast-producing agent a preparation comprising at least one member selected from the group consisting of (1) iodo compounds of the formula

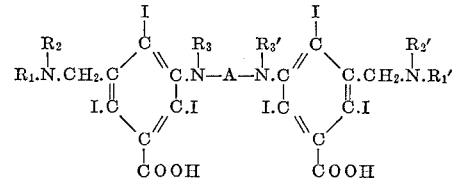

wherein $R_1$ and $R_1'$ are each a member selected from the group consisting of hydrogen and lower alkyl having no more than 5 carbon atoms and $R_2$, $R_2'$, $R_3$ and $R_3'$ are each lower acyl having no more than 5 carbon atoms, and wherein A is an alkylene group substituted by at least one substituent of the formula —O—$R_4$, wherein $R_4$ is a member selected from the group consisting of hydrogen, lower alkyl and acyl having no more than 5 carbon atoms, said alkylene group containing 3–10 carbon atoms and being broken by at least one oxygen bridge, and (2) physiologically acceptable salts thereof; said preparation being administered in an amount effective to give a sufficient contrast effect.

15. The method of claim 14 wherein each nitrogen atom in the bridge

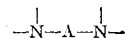

of the iodo compound is situated at a distance of two carbon atoms from a group —O—$R_4$, and wherein not more than one oxygen atom is bound to one and the same carbon atom in the bridge A.

16. The method of claim 14, wherein $R_1$ and $R_1'$ in the iodo compound are each a member selected from the group consisting of hydrogen, methyl and ethyl and $R_2$, $R_2'$, $R_3$ and $R_3'$ are each a member selected from the group consisting of acetyl and propionyl and $R_4$ is a member selected from the group consisting of hydrogen, methyl, ethyl, acetyl and propionyl.

17. A preparation for carrying out the X-ray visualization of body cavities by being administered to the body of the test object as a contrast-producing agent a mixture which comprises an aqueous solution comprising water and at least one member selected from the group consisting of (1) iodo compounds of the formula

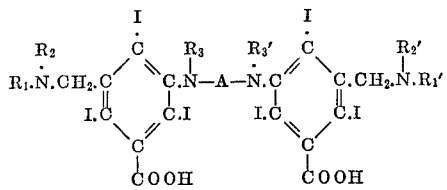

wherein $R_1$ and $R_1'$ are each a member selected from the group consisting of hydrogen and lower alkyl having no more than 5 carbon atoms and $R_2$, $R_2'$, $R_3$ and $R_3'$ are each lower acyl having no more than 5 carbon atoms and wherein A is an alkylene group substituted by at least one substituent of the formula —O—$R_4$, wherein $R_4$ is a member selected from the group consisting of hydrogen, lower alkyl and acyl having no more than 5 carbon atoms, said alkylene group containing 3–20 carbon atoms, and (2) physiologically acceptable salts thereof, and wherein said at least one member is present in an effective contrast-producing amount.

18. The preparation of claim 17, wherein said mixture is an aqueous solution for injection purpose and oral use; and wherein said at least one member is present in an amount equal to about 10 to 50 grams per 100 ml. of the preparation.

19. The preparation of claim 17 wherein said alkylene group contains 3–10 carbon atoms.

20. The preparation of claim 19 wherein said mixture is an aqueous solution for injection purpose and oral use; and wherein said at least one member is present in an amount equal to about 10 to 50 grams per 100 ml. of the preparation.

21. A preparation for carrying out the X-ray visualization of body cavities by being administered to the body of the test object as a contrast-producing agent a mixture which comprises an aqueous solution comprising water and at least one member selected from the group consisting of (1) iodo compounds of the formula

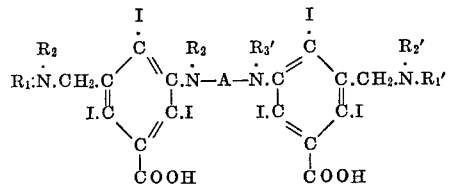

wherein $R_1$ and $R_1'$ are each a member selected from the group consisting of hydrogen and lower alkyl having no more than 5 carbon atoms and $R_2$, $R_2'$, $R_3$ and $R_3'$ are each lower acyl having no more than 5 carbon atoms and wherein A is an alkylene group substituted by at least one substituent of the formula —O—$R_4$, wherein $R_4$ is a member selected from the group consisting of hydrogen, lower alkyl and acyl having no more than 5 carbon atoms, said alkylene group containing 3–20 carbon atoms and being broken by at least one oxygen bridge, and (2) physiologically acceptable salts thereof, and wherein said at least one member is present in an effective contrast-producing amount.

22. The preparation of claim 21, wherein said mixture is an aqueous solution for injection purpose and oral use; and wherein said at least one member is present in an amount equal to about 10 to 50 grams per 100 ml. of the preparation.

23. The preparation of claim 21 wherein said alkylene group contains 3–10 carbon atoms.

24. The preparation of claim 23 wherein said mixture is an aqueous solution for injection purpose and oral use; and wherein said at least one member is present in an amount equal to about 10 to 50 grams per 100 ml. of the preparation.

References Cited
UNITED STATES PATENTS

| | | | |
|---|---|---|---|
| 3,178,473 | 4/1965 | Holtermann et al. | 424—5 |
| 2,776,241 | 1/1957 | Priewe et al. | 424—5 |
| 3,290,366 | 12/1966 | Hoey | 260—518 |
| 3,306,927 | 2/1967 | Larsen | 260—471 |

ALBERT T. MEYERS, Primary Examiner

F. E. WADDELL, Assistant Examiner

U.S. Cl. X.R.

260—519